C. W. Sanborn,
Horse Rake.

No. 98637.   Patented Jan. 4, 1870.

Witnesses.
D. D. Kane
E. W. Anderson

Inventor
C. W. Sanborn
Chipman Hosmer & Co.
Attys.

United States Patent Office.

CHARLES W. SANBORN, OF MORRILL, MAINE.

Letters Patent No. 98,637, dated January 4, 1870.

IMPROVEMENT IN HORSE HAY-RAKE.

The Schedule referred to in these Letters Patent and making part of the same

*To all whom it may concern:*

Be it known that I, CHARLES W. SANBORN, of Morrill, in the county of Waldo, and State of Maine, have invented a new and valuable Improvement in Horse-Rake; and I do hereby declare that the following is a full, clear, and exact description of the construction and operation of the same, reference being had to the annexed drawings, making a part of this specification, and to the letters and figures of reference marked thereon.

Figure 1, of the drawings, is a plan view of my rake;

My invention relates to horse hay-rakes; and

It consists in a novel arrangement of devices, intended to serve as valuable improvements in such rakes.

My horse-rake is connected with a sulky, of which the letter A represents the shafts, B, the wheels, and D, the axle.

The letters $c$ represent the fingers of the rake, and $n$, the teeth.

The fingers are connected together by the rod $g$, that is passed through the heads of the entire group, as shown, above the axle, where they are held by a series of supporting-rods, $h$.

Figure 1:
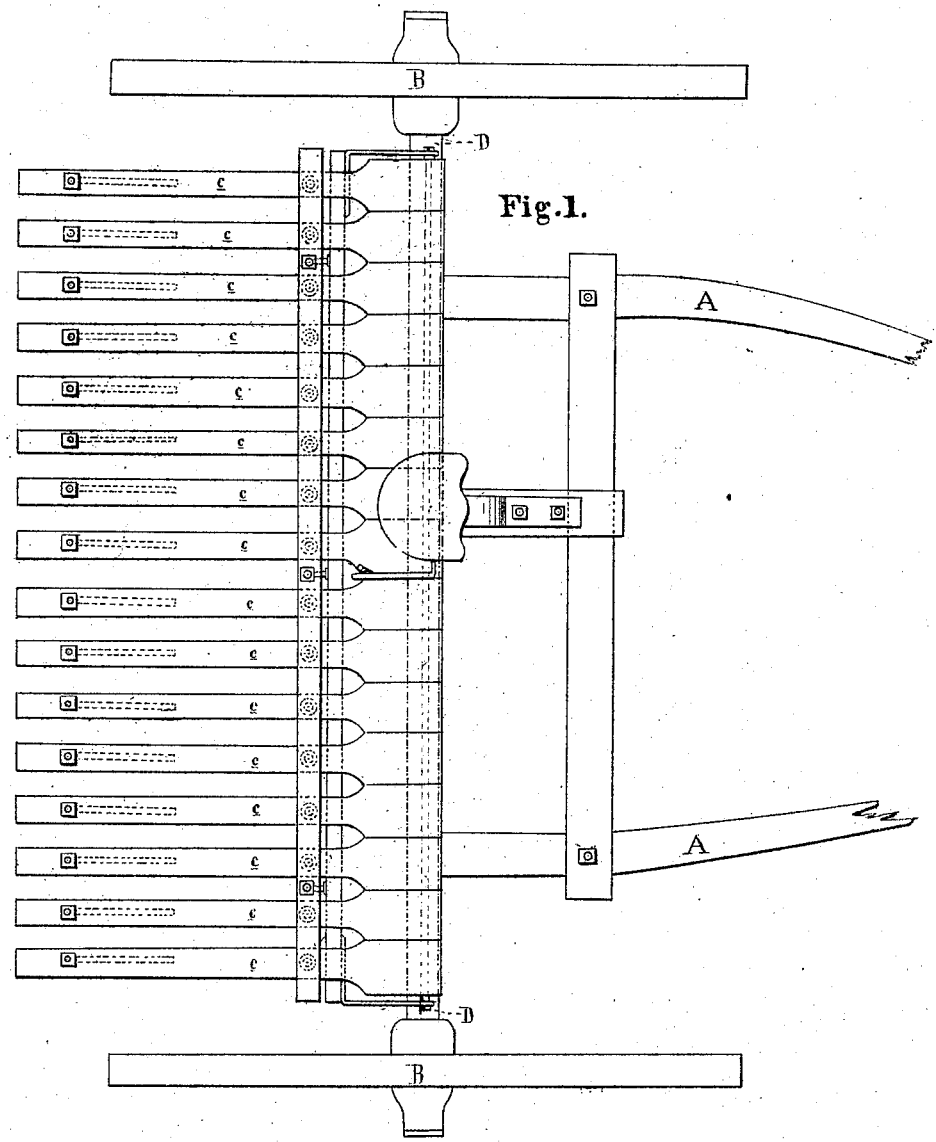
Figure 2:
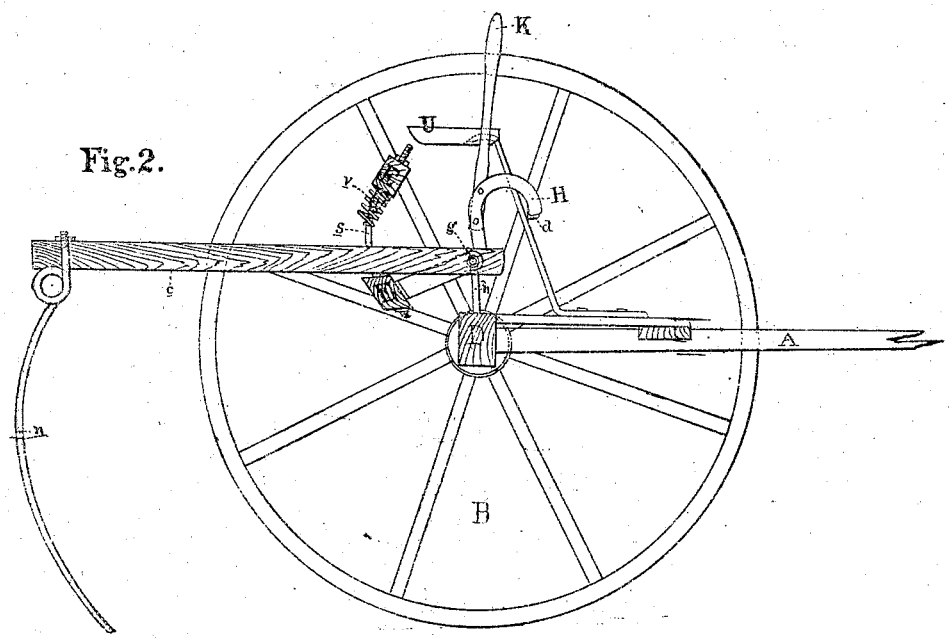
Figure 2 is a sectional view thereof.
Figure 3:
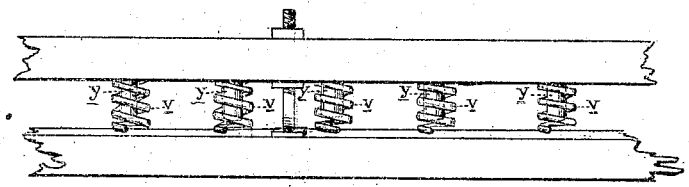
Figure 3 is a detail.

The teeth of my rake are, respectively, attached to the rear ends of the fingers by a nut and screw-thread, as shown on fig. 2, and are constructed with a coil below said fingers, as represented on said figure.

Both above and below the group of fingers, I arrange a horizontal bar, marked E, which are connected together by a series of perpendicular rods, marked $s$, which said rods have nuts and screw-threads above and below said bars, to the end that the position of said bars may be made adjustable at will.

The above-mentioned bars are operated by the elbow-lever H, the handle K, and foot-rest $d$, by means of which the rake-fingers may be lowered or raised by the operator while occupying the driver's seat U.

I attach a coiled spring, $v$, to the upper bar E, immediately above each of the fingers, and I give strength and permanence to said springs by means of the pins $y$.

This arrangement allows independent action to each of the fingers by leaving a space between it and the spring above, while, at the same time, it enables the operator to hold the rake-teeth closely to the ground, when desirable.

The distance between the fingers and the springs is regulated, at will, by means of the nuts and screws upon the rods that connect the bars E, which improvement I find of great value in adapting the rake to smooth or rough ground.

I claim, as my invention—

In a horse-rake constructed as herein described, the bars E, made adjustable by nuts and screws on the rods $s$, in combination with the springs $v$ and supporting-pins $y$, substantially as specified.

In testimony that I claim the above, I have hereunto subscribed my name, in the presence of two witnesses.

CHARLES W. SANBORN.

Witnesses:
 NEHEMIAH ABBOTT,
 C. B. ABBOTT.